United States Patent
Covi et al.

(10) Patent No.: US 6,786,639 B2
(45) Date of Patent: Sep. 7, 2004

(54) DEVICE FOR SENSING TEMPERATURE OF AN ELECTRONIC CHIP

(75) Inventors: Kevin Covi, Glenford, NY (US); Raymond Longhi, Poughkeepsie, NY (US); Edward J. Seminaro, Milton, NY (US); Steven G. Shevach, Hurley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/232,258

(22) Filed: Aug. 30, 2002

(65) Prior Publication Data

US 2004/0042529 A1 Mar. 4, 2004

(51) Int. Cl.[7] .......................... G01K 15/00; G01K 7/16; G01K 3/06; G01K 1/14
(52) U.S. Cl. .......................... 374/178; 374/1; 374/137; 374/185; 324/763; 324/525; 702/130
(58) Field of Search .................. 374/178, 170–171, 374/44–45, 57, 163, 137, 183, 1, 110, 112, 185; 324/763, 764–765, 522, 523, 525–527, 512; 327/512; 702/99, 130, 133

(56) References Cited

U.S. PATENT DOCUMENTS

| | | | | |
|---|---|---|---|---|
| 4,644,253 A | * | 2/1987 | Libert ........................ 323/275 |
| 4,713,612 A | * | 12/1987 | Takamine ................ 324/158 D |
| 4,779,161 A | * | 10/1988 | DeShazo, Jr. ................ 361/106 |
| 4,964,737 A | * | 10/1990 | Baker et al. ................. 374/179 |
| 5,046,363 A | * | 9/1991 | Moore ......................... 73/588 |
| 5,154,514 A | | 10/1992 | Gambino et al. ........... 374/178 |
| 5,171,091 A | * | 12/1992 | Kruger et al. .............. 374/183 |
| 5,213,416 A | | 5/1993 | Neely et al. ................. 374/178 |
| 5,414,352 A | * | 5/1995 | Tanase ..................... 324/158.1 |
| 5,477,417 A | * | 12/1995 | Ohmori et al. ............. 361/695 |
| 5,488,350 A | * | 1/1996 | Aslam et al. ............ 338/225 D |
| 5,502,838 A | * | 3/1996 | Kikinis ........................ 395/550 |
| 5,519,193 A | * | 5/1996 | Freiermuth et al. ......... 219/678 |
| 5,590,061 A | * | 12/1996 | Hollowell, II et al. ... 364/571.03 |
| 5,617,035 A | * | 4/1997 | Swapp ........................ 324/711 |
| 5,639,163 A | | 6/1997 | Davidson et al. ........... 374/178 |
| 5,764,541 A | * | 6/1998 | Hermann et al. ............. 702/98 |
| 5,829,876 A | * | 11/1998 | Schwartz et al. ............... 374/1 |

(List continued on next page.)

FOREIGN PATENT DOCUMENTS

| | | | | |
|---|---|---|---|---|
| JP | 58073145 A | 5/1983 | .......... H01L/23/56 |
| JP | 63000132 A | 1/1988 | .......... H01L/21/65 |
| JP | 2023645 A | 1/1990 | .......... H01L/27/04 |
| JP | 7074218 A | 3/1995 | .......... H01L/21/66 |
| JP | 11211792 A | 8/1999 | .......... G01R/31/28 |

OTHER PUBLICATIONS

US patent application Publication No. US 2001/0026576 A1, Beer et al, S#09/801,963 "Method for Determining The Temperature of A Semiconductor Chip and Semiconductor Chip with Temperature Measure Configuration", 2001.

*Primary Examiner*—Gail Verbitsky
(74) *Attorney, Agent, or Firm*—Floyd A. Gonzalez (57) ABSTRACT

A method and apparatus for measuring the temperature on an electronic chip. The Apparatus includes a thermal sense element on the chip, a power supply passing electrical current through said thermal sense element at a known voltage and temperature, and a measuring circuit determining the initial resistance of the thermal sense element at said known voltage and temperature. The measuring circuit measures the change of the resistance of the thermal sense element as the temperature of the electronic chip changes, and compares the change in resistance of the thermal sense element to the initial resistance. The measuring circuit determines the temperature of the electronic chip from the initial resistance and change in resistance of the thermal sense element during the operation of the electronic chip.

16 Claims, 7 Drawing Sheets

U.S. PATENT DOCUMENTS

| | | | | |
|---|---|---|---|---|
| 5,902,044 A | * | 5/1999 | Pricer et al. | 374/112 |
| 5,920,264 A | * | 7/1999 | Kim et al. | 340/584 |
| 5,942,908 A | * | 8/1999 | Cain | 324/765 |
| 6,002,991 A | * | 12/1999 | Conn, Jr. | 702/117 |
| 6,005,409 A | * | 12/1999 | Bui et al. | 324/769 |
| 6,008,664 A | * | 12/1999 | Jett et al. | 324/765 |
| 6,344,747 B1 | * | 2/2002 | Lunghofer et al. | 324/537 |
| 6,363,490 B1 | * | 3/2002 | Senyk | 713/300 |
| 6,425,092 B1 | * | 7/2002 | Evans et al. | 714/13 |
| 6,491,426 B1 | * | 12/2002 | Schonath et al. | 374/45 |
| 6,559,667 B1 | * | 5/2003 | Tarter | 324/760 |
| 6,701,273 B2 | * | 3/2004 | Nishigaki et al. | 702/132 |
| 6,724,313 B2 | * | 4/2004 | Sato et al. | 340/590 |
| 2001/0021217 A1 | * | 9/2001 | Gunther et al. | 374/178 |
| 2002/0087927 A1 | * | 7/2002 | Felber et al. | 714/724 |
| 2003/0206127 A1 | * | 11/2003 | Roberts et al. | 341/155 |
| 2003/0214998 A1 | * | 11/2003 | Gauthier et al. | 374/141 |
| 2004/0008754 A1 | * | 1/2004 | Clabes et al. | 374/183 |

* cited by examiner

DEVICE FOR SENSING TEMPERATURE OF AN ELECTRONIC CHIP

BACKGROUND OF THE INVENTION

The present invention is related to sensing temperature and is more particularly related to sensing temperature of an electronic chip at the chip level.

U.S. Pat. No. 5,213,416 issued May 25, 1993 to Neely et al. for ON CHIP NOISE TOLERANT TEMPERATURE SENSING CIRCUIT discloses an on-chip temperature sensing circuit which includes a differential voltage source (DVS) having first and second branches, each branch having thermal sensitive transistor connected in series with a current source, amplifiers coupled to the output nodes of first and second branches of DVS, and a means for generating an on-chip voltage signal at an output electrode of chip which provides a voltage signal indicative of the temperature of the chip.

U.S. Pat. No. 5,639,163 issued Jun. 17, 1997 to Davidson et al. for ON-CHIP TEMPERATURE SENSING SYSTEM discloses an on-chip temperature sensing system which includes first and second thermal sensing diodes interconnected with a common cathode to supply to form a differential sensing pair formed on a chip, a power supply disposed apart from chip, a first precision resistor coupling power provide a first current of a predetermined magnitude, a second first thermal sensing diode to precision resistor coupling power supply to thermal sensing diode to provide a second current of a predetermined magnitude, and means to couple the anode of first thermal sensing diode to the anode of second thermal sensing diode as differential inputs to a high impedance amplifier.

U.S. Pat. No. 5,154,514 issued Oct. 13, 1992 to Gambino et al. for ON-CHIP TEMPERATURE SENSOR UTILIZING A SCHOTTKY BARRIER DIODE STRUCTURE discloses an on-chip temperature sensor which includes a diode structure including a silicon substrate, a first region of a metal silicide in silicon substrate, a second region of a metal-oxide semiconductor material on first region, a third region of a metal over second region and means using said diode structure as a temperature sensitive device for measuring an ambient temperature.

Japanese patent JP7074218A published Mar. 17, 1995 by Tamotsu Naganuma for TEST METHOD OF IC AND ITS PROBE CARD discloses temperature of the IC chip is monitored directly by a method wherein a temperature sensor probe is brought into contact with the surface of an IC chip.

Japanese patent JP58073145A published May 2, 1983 by Hiroyuki Futaki for SEMICONDUCTOR PACKAGE discloses a method for measuring temperature of the chip wherein a temperature sensor is built in the package which senses the temperature of the chip directly.

U.S. Patent application Publication 2001/0026576A1 published Oct. 4, 2001 by Beer et al. for METHOD FOR DETERMINING THE TEMPERATURE OF A SEMICONDUCTOR CHIP AND SEMICONDUCTOR CHIP WITH TEMPERATURE MEASURING CONFIGURATION discloses a method for determining a temperature of a chip which includes impressing a defined current onto selected chip terminals, measuring a voltage occurring at least partially at a semiconductor diode disposed between the selected chip terminals using four-conductor connection technology, and determining the temperature of the chip by reference to the voltage and the defined current.

Japanese patent JP2023645A published Jan. 25, 1990 by Masaaki Uno for SEMICONDUCTOR INTEGRATED CIRCUIT discloses measuring chip temperature by mounting a temperature sensor detecting the chip temperature of a semiconductor integrated circuit by means of the drain current of a MOS transistor at a state in which a prescribed voltage is impressed between a gate electrode and source/drain regions of the MOS transistor.

Japanese patent JP63000132A published Jan. 5, 1988 by Akiyoshi Takeyasu for WAFER TESTING UNIT discloses determining the surface temperature of a wafer and chip by incorporating probe needles and a novel temperature sensor for detecting a chip temperature, and providing a control box controlling the temperature sensor.

Japanese patent JP11211792A published Aug. 6, 1999 by Junichi Seki for PROTECTION DEVICE OF SEMICONDUCTOR-TESTING DEVICE discloses measuring chip temperature directly by forming a diode on a silicon chip as a temperature sensor, and measuring forward characteristics of the diode.

SUMMARY OF THE INVENTION

The present invention provides for accurately and inexpensively measuring chip temperatures by a combination of on-chip temperature sense elements, Kelvin connection, and calibration.

The present invention provides for measuring the temperature of a chip while in operation. The present invention further provides for measuring chip temperature accurately. The present invention further provides for minimizing the cost of accurately measuring the temperature of a chip while in operation.

An object of the present invention is to minimize the thermal resistance between the thermal sensor and the chip being monitored. This is accomplished by measuring the resistance of a metallic coil located directly on the chip. The coil is essentially the same temperature as the chip.

It is also an object of the present invention to provide a unique calibration scheme which takes advantage of the resistance versus temperature characteristics of metallic coil. These characteristics translate to a mathematical straight line y=mx+b. Substituting resistance and temperature values results in $$t=m(R-r)+R$$

Where:
  m is the mathematical slope which models the physical characteristics of the metallic coil's inherent resistance versus temperature characteristics.
  R is the resistance of the coil at a given known temperature such as room temperature. R is the calibrated resistance of a measured metallic coil resistance versus measured temperature.
  (R−r) is the resistance change of the coil from its room temperature resistance.
  t is the calculated temperature of the coil and thus the temperature of the chip.

Calibration proceeds by determining R. To accomplish this requires the coil to be at a known temperature and then measuring its resistance. With the system powered off, the cooling system is allowed to blow room temperature air across the chip. While this is in progress, the resistance of the coil is monitored. The coil is determined to be at room temperature when its resistance becomes stable i.e. stops changing. At this point the coil is at the same temperature (room temperature) as the air being moved across it. The power system now measures the room temperature at the air input to the cooling system used to cool the chip. The resultant is a known resistance R at a known temperature. The calibration data is stored for use in dynamic calculations of the chip temperature.

It is a further object of the present invention to provide an accurate, inexpensive resistance measurement. Resistance is measured by forcing a voltage and measuring the resulting current. Each power supply contains a measurement circuit and is connected to a dedicated chip coil. This allows each supply to monitor chip temperature. Accuracy is achieved by a variable output forcing voltage to maximize signal strength for the particular measurement conditions. During the calibration phase (unbiased phase) less forced voltage can be tolerated, as opposed to the powered state during normal measurement where a higher voltage can be supported after chip bias has been applied. Since the higher forced voltage can induce self heating and alter the coil resistance, duty cycle is controlled on the forced voltage that can be as little as 3% to get high signal strength without inducing self heating An inexpensive solution is achieved by using a single base circuit and multiplexing multiple metallic coils. Due to the already enforced duty cycle limit, many coil elements can be measured seemingly simultaneously by time sharing the base circuit. Multiplexing in a fixed known resistance (test point resistance) also adds accuracy, and error detection, since the known resistance validates the base circuit is working properly and within tolerance.

BRIEF DESCRIPTION OF THE DRAWINGS

These and other objects will be apparent to one skilled in the art from the following detailed description of the invention taken in conjunction with the accompanying drawings in which.

DESCRIPTION OF THE PREFERRED EMBODIMENT

Figure 1:
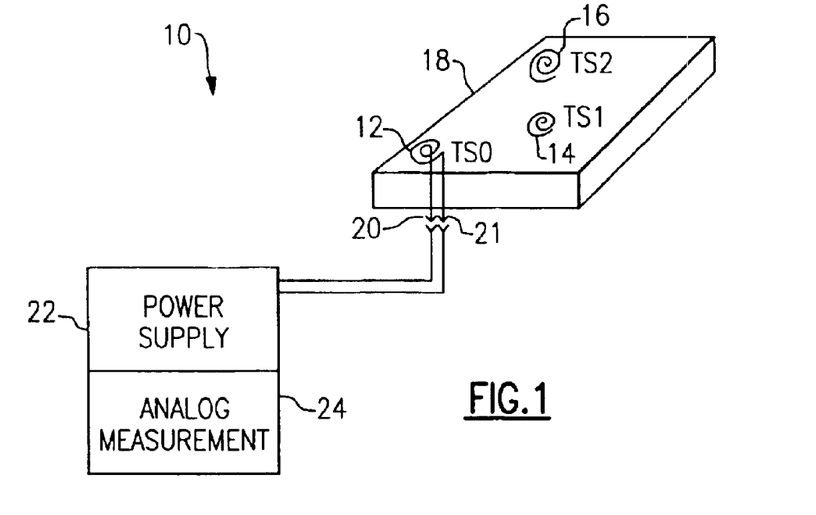
FIG. 1 is a schematic diagram of a thermal system of the present invention having thermal sense elements formed on an electronic chip, and a power supply module for supplying power to the thermal sense elements for measuring the temperature of the chip.

FIG. 1 is a schematic diagram of a thermal system 10 of the present invention having thermal sense elements TS0 (12), TS1 (14), and TS2 (16) formed in the metallization layer of an electronic chip 18. The thermal sense elements (such as TS0 (12), have electrical connections 20 and 21 for supplying power to the thermal sense elements from a power supply module 22. The power supply module 22 contains an analog measurement circuit 24 for measuring the resistance of the thermal sense elements 12, 14, and 16, and calculating the temperature of the elements, as will be explained. The analog measurement circuit 24 may be part of the power supply module 22, or may be a separate module, as desired. Also, instead of the analog measurement circuit 24 shown, the measurement circuit may include a digital processor and perform digital calculations of the temperatures of the thermal sense elements 12, 14, and 16, if desired.

The thermal sense elements 12, 14, and 16 are copper metallic coils located in the metallization layer of the chip 18, each coil having a metal length of 20 mm and a width of 2.7 micro meters ($10^{-6}$ meters) which produces a nominal resistance value of around 600 Ohms at approximately 25 degrees C.

Figure 2:
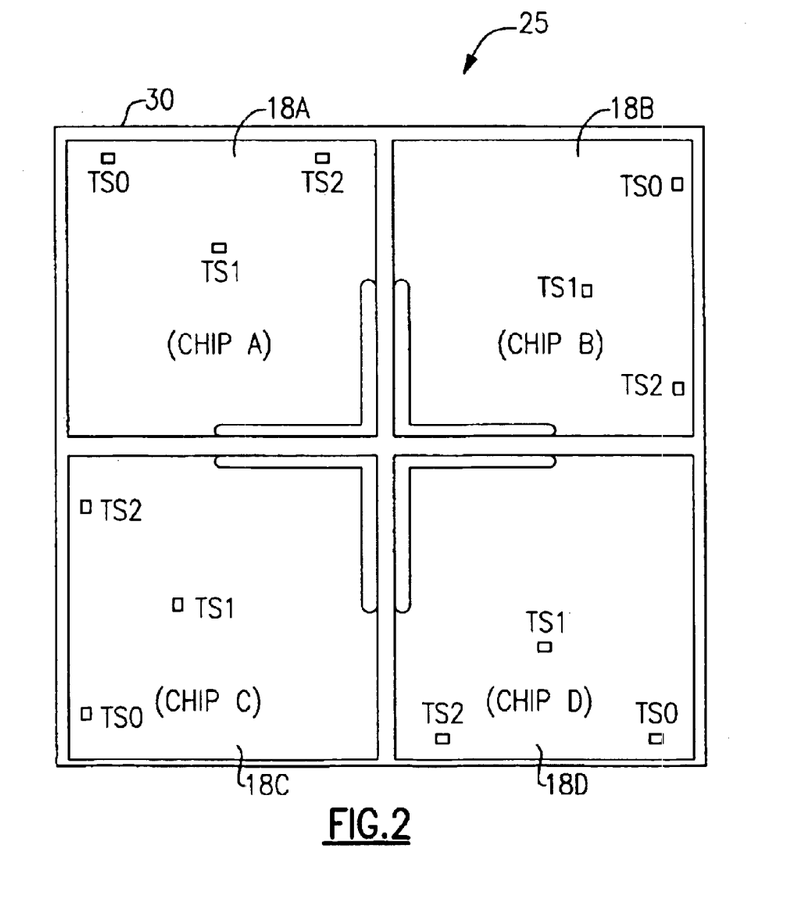
FIG. 2 is a diagram of a Multichip Module (MCM) having four of the electronic chips of FIG. 1.
Figure 3:
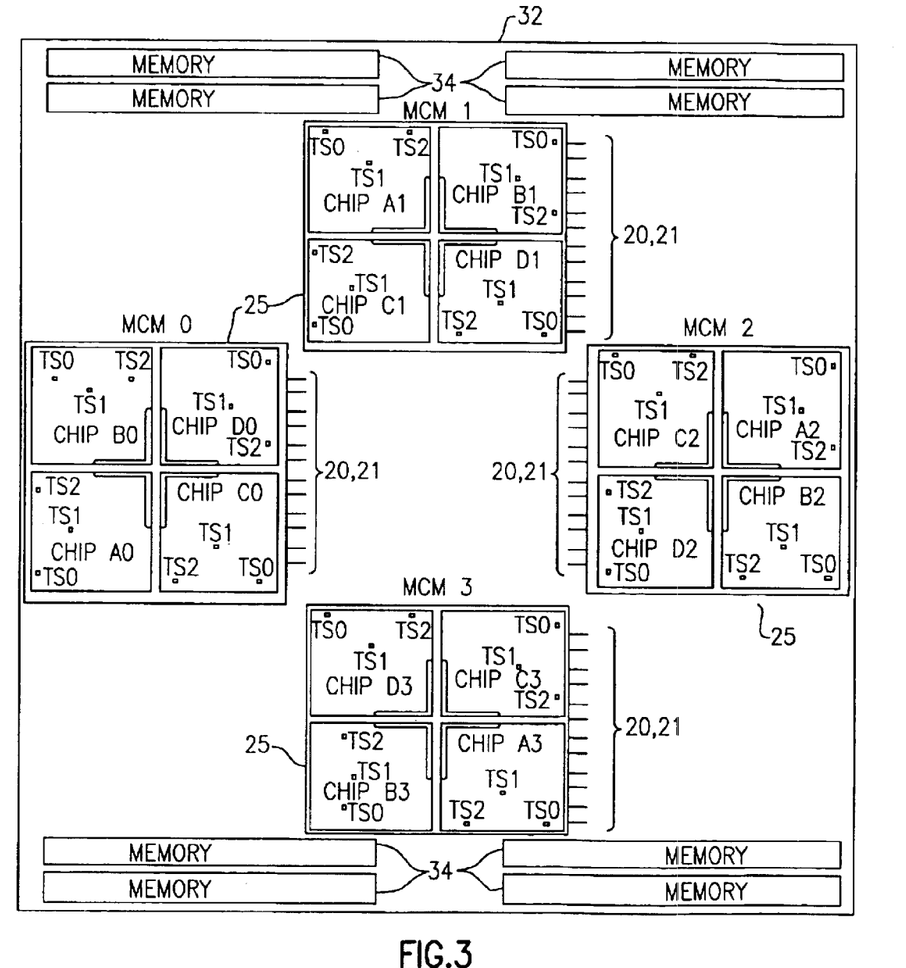
FIG. 3 is a diagram of a board layout having four of the MCMs of FIG. 2.

FIG. 2 is a diagram of a Multichip Module (MCM) 25 having four of the electronic chips 18A, 18B, 18C and 18D, of FIG. 1. These chips 18A–D are mounted in a carrier 30 in such a way that the thermal sense elements 12, 14, and 16 are dispersed over the area of the MCM 25 in a random manner to provide a better overall temperature measurement of the MCM. FIG. 3 is a diagram of a board 32 having four of the MCMs 25 of FIG. 2 mounted thereon. The board 32 may have other electronic components, such as memory chips 34 mounted thereon, as well as the MCMs 25. Each of the MCMs 25 includes thermal sensor leads 20, 21 for supplying power to the thermal sense elements 12, 14, and 16, as explained in FIG. 1. The MCMs 25 are arranged on the board 32 in such a way that the thermal sense elements 12, 14, and 16 of the MCMs 25 are dispersed over the surface area of the board 32 in a random manner to provide a better overall temperature measurement of the board 32.

Figure 4:
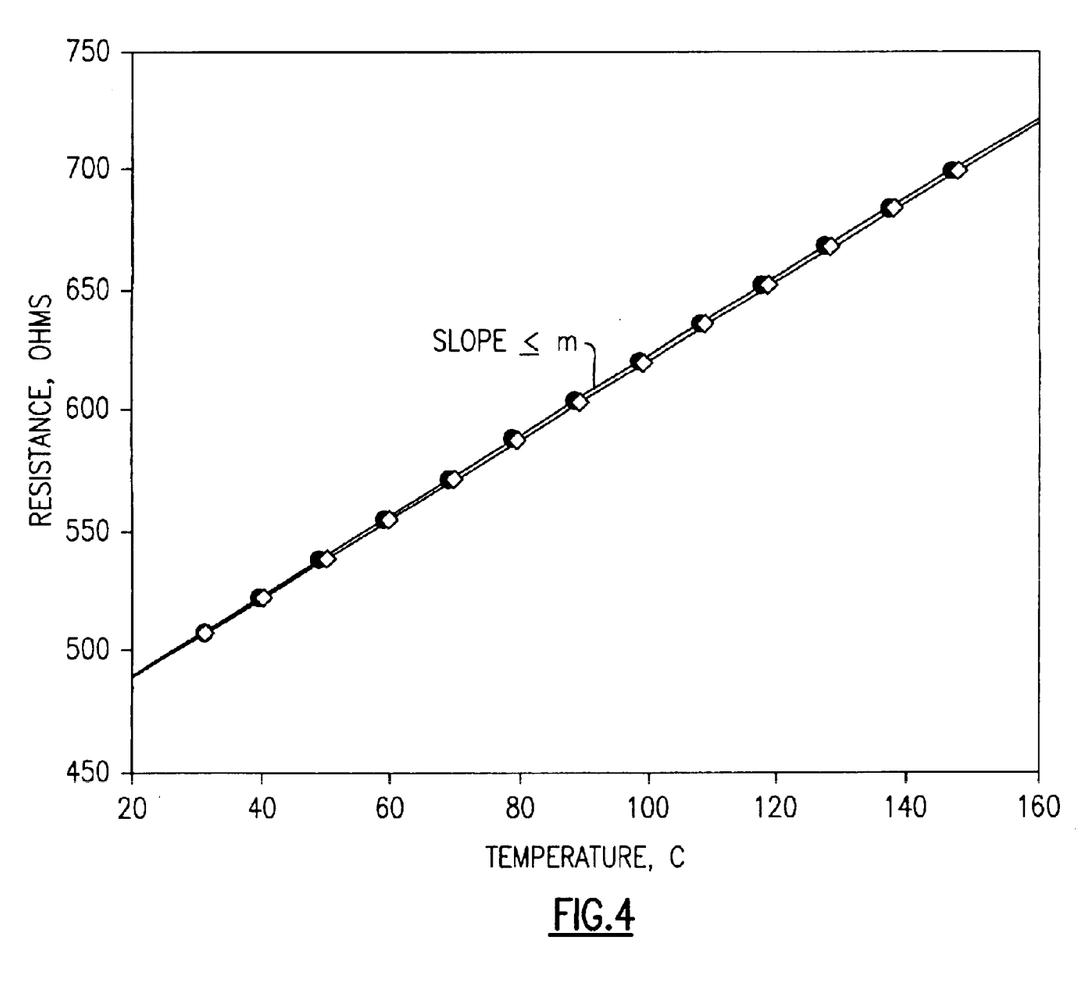
FIG. 4 is a plot of resistance in ohms of copper versus the temperature of the copper in degrees C.

FIG. 4 is a plot of resistance in ohms of copper versus the temperature of the copper in degrees C. Copper has a temperature of 0.358% change per degree C or temperature change. Thus, as shown in FIG. 4, as the temperature of copper increases, the resistance of the copper increases. By measuring the resistance R of a thermal sensor element at an initial point (calibration), it is possible to determine the initial temperature (calibration temperature) of the thermal sensor element. By measuring the resistance change (R−r), it is possible to determine the present temperature of the thermal sensor element by the equation $t=m(R-r)+R$ as previously discussed where m is the slope of the resistance versus temperature plot of FIG. 4.

Figures 5, 5A:
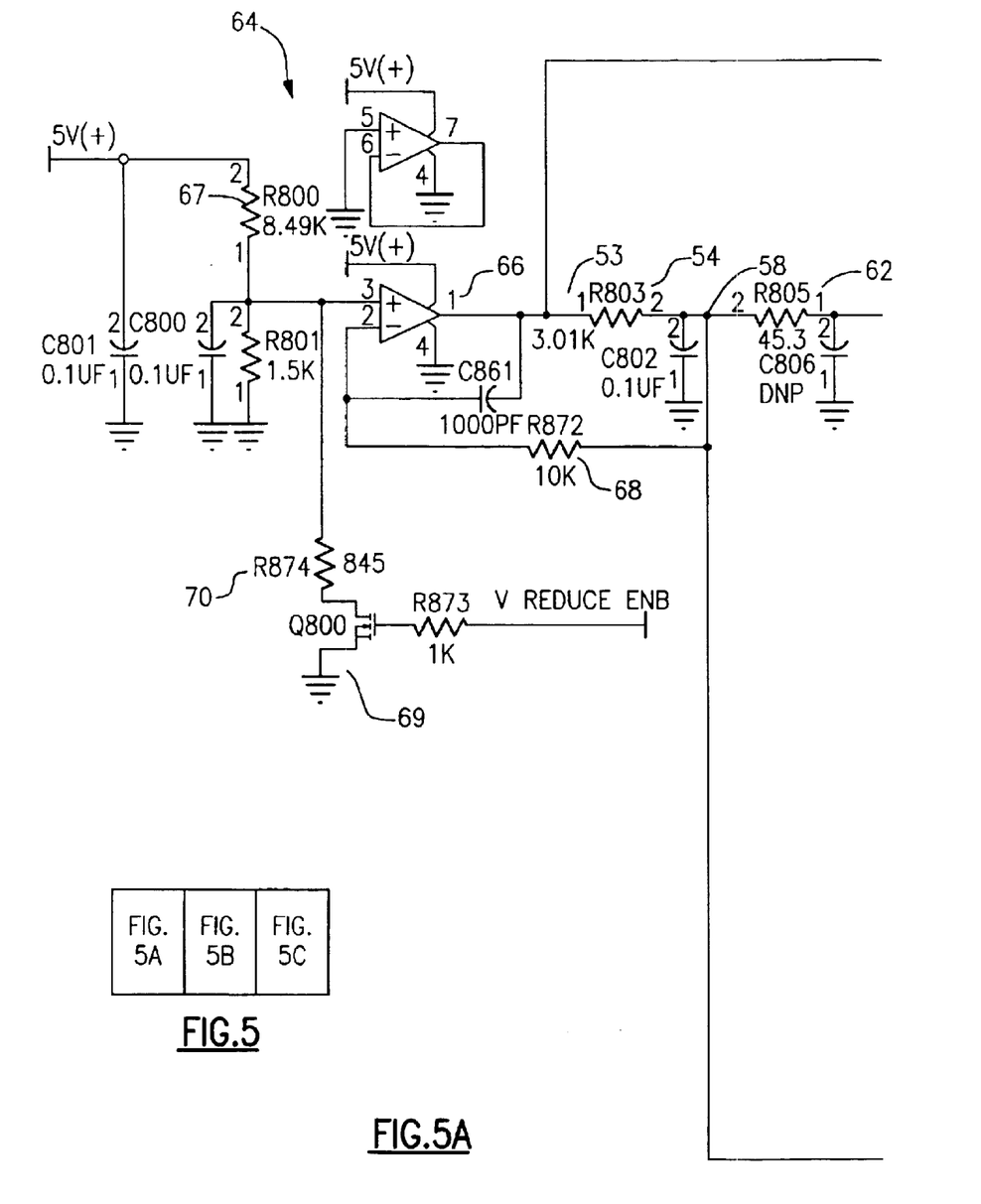
FIG. 5 is a schematic diagram of the power supply circuit of FIG. 1 wherein the temperatures of the thermal sense elements are measured by a plurality of enabling signals.
Figure 5B:
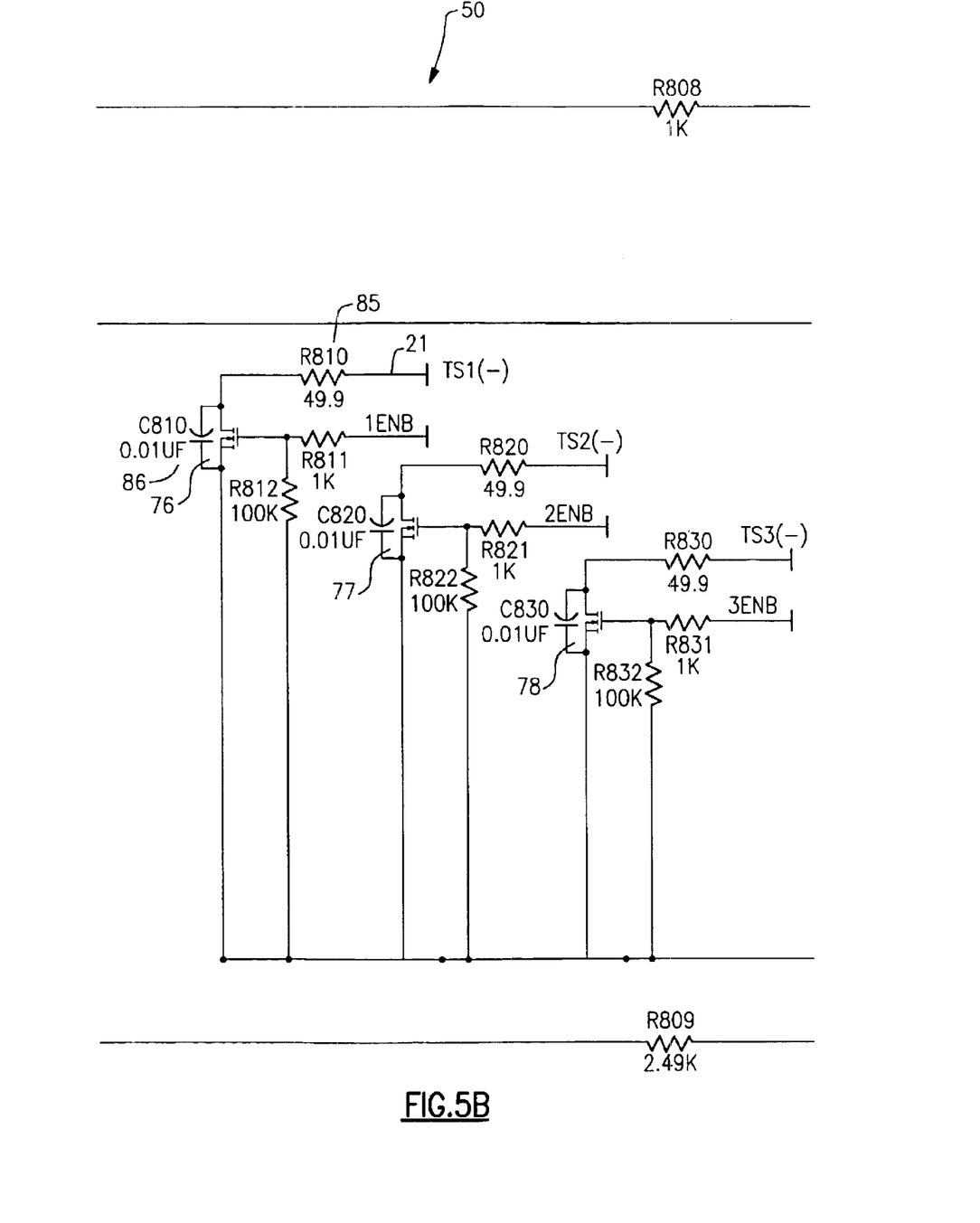
Figure 5C:
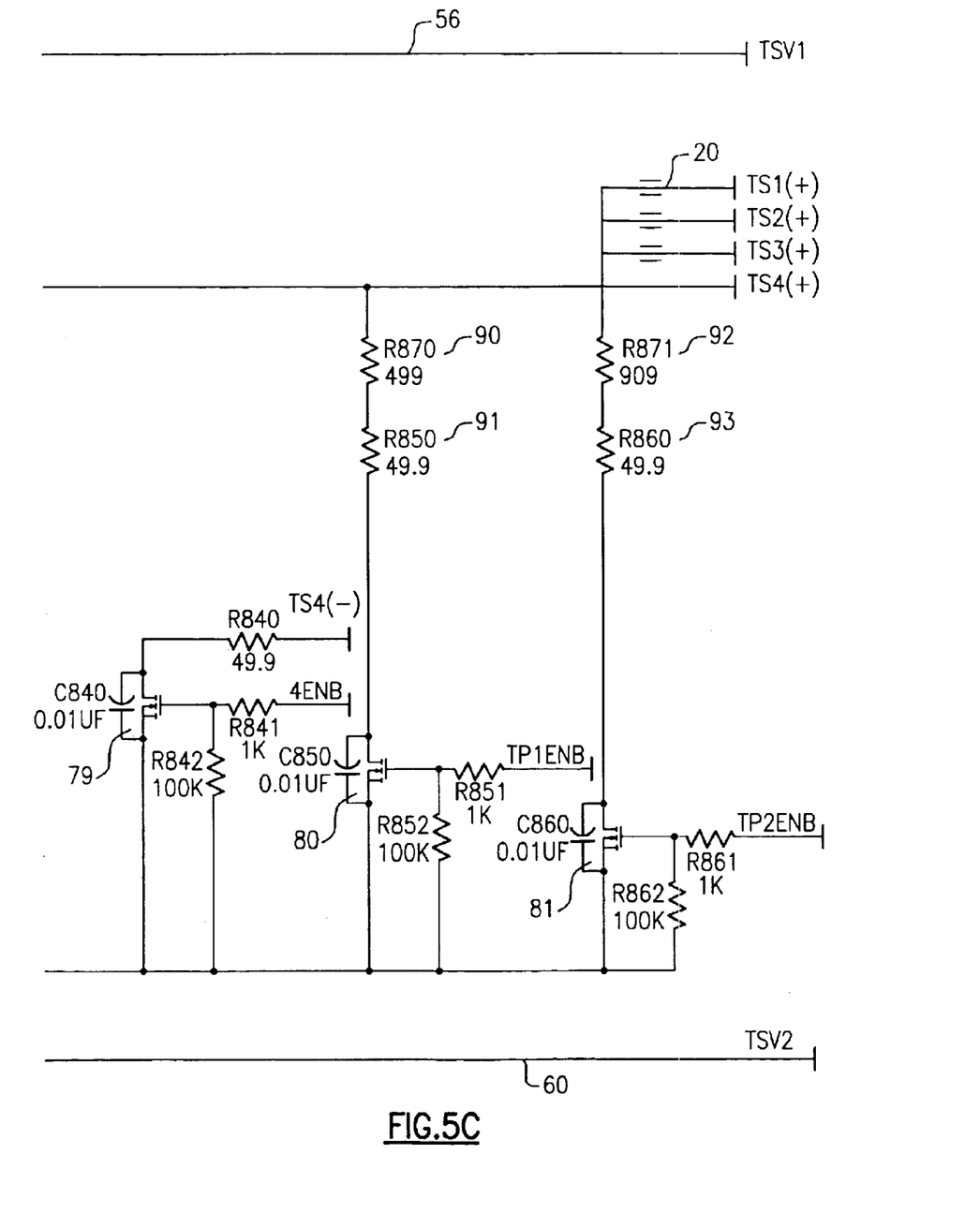

FIG. 5 is a schematic diagram of an enabling circuit 50 of the power supply circuit 22 of FIG. 1 wherein the temperatures of the thermal sensor sense elements are measured sequentially applying power to the thermal sense elements 12, 14, and 16 of each chip 18. The enabling circuit 50 places a forcing voltage at 58 across a precision resistor 54. The voltage at 53 is sampled by the analog measurement circuit 24 by a Test Sensor Voltage1 (TSV1) lead. Similarly, the forcing voltage at 58 on the other side of resistor 54 is sampled by circuit 24 by a Test Sensor Voltage2 (TSV2) lead 60. Thus by knowing the voltage drop across resistor 54, the current through the temperature sense element of interest can be determined, and knowing the current and the voltage at 58, the resistance of the resistor 62 plus the resistance of the temperature sense element of interest can be determined. By taking multiple resistance measurements over time, the change in resistance of a temperature sense element can be determined, and thus the temperature of the sense element can be calculated in accordance with the equation, as earlier discussed.

The enabling circuit 50 includes a forcing voltage circuit 64 which includes an operational amplifier 66 with its first input connected to a +5 volt supply through resistor 67, a feedback resistor 68 connected to 58 to force the voltage at 58 to a desired level, and a Field Effect Transistor (FET) 69 which acts as a switch to switch in resistor 70 when the when a Voltage Reduce Enable (V Reduce Enb) is placed on the gate of the FET 69. With FET 69 turned, the resistors 67 and 70 act as a voltage divider to lower the voltage at 53 to a desired level. In the present embodiment, the desired lower voltage or calibration voltage is 0.3 volts, and the desired higher voltage or measuring voltage is 0.75 volts.

Figure 6:
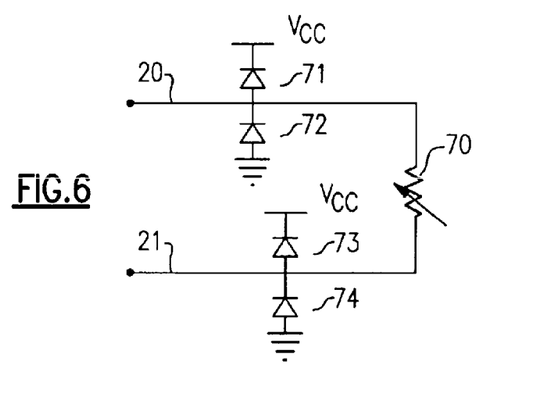
FIG. 6 is a schematic diagram of the electrostatic discharge diode circuit of each of the thermal sense elements of FIG. 1.

Turning to FIG. 6, the need for a reduced calibration voltage will be discussed. The thermal sense element is represented in FIG. 6 by a thermister 70. Each of the leads 20 and 21 are connected to electrostatic discharge diodes 71 and 72, and 73 and 74, respectively. The cathode of diodes 71 and 73 are connected to the Vcc bus. Thus, when the chip 18 is turned off during calibration, the voltage on the leads 20 and 21 must be low enough that diodes 71 and 73 do not conduct. Thus the calibration voltage in the present embodiment is 0.3 volts. When the chip 18 is turned on, Vcc is on the Vcc bus, and the operating of measuring voltage is raised to 0.75 volts to provide for more accurate measurements.

Figure 7:
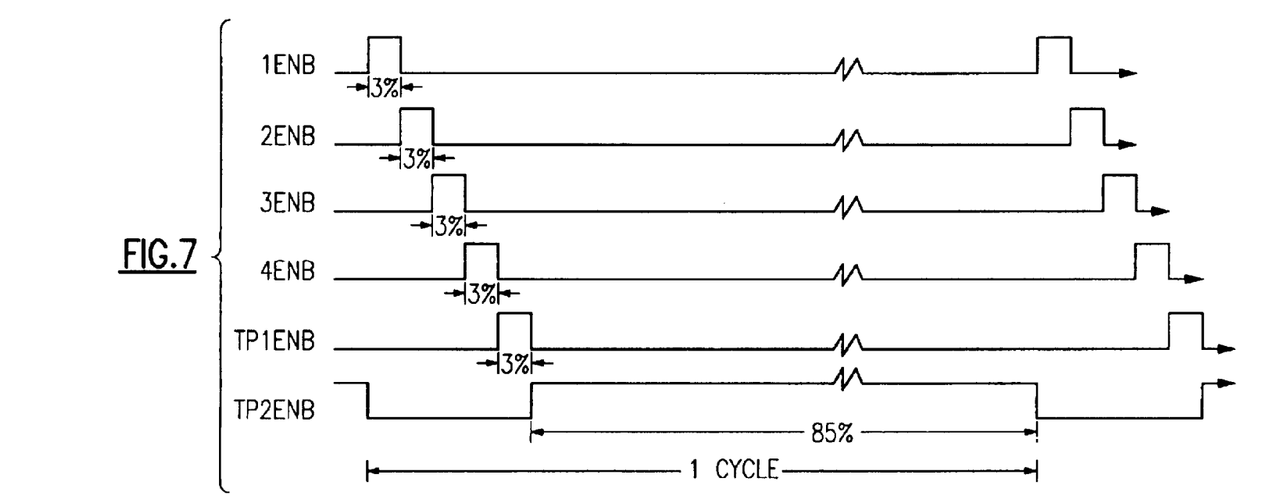
FIG. 7 is a timing diagram showing the enabling signals applied to the circuit of FIG. 5 for reading the resistance of the thermal sense elements of FIG. 1.

Returning to FIG. 5, the enabling circuit 50 includes four FET switches 76, 77, 78, and 79, one for each of the thermal sense elements to be measured by this circuit. In addition the circuit includes FET switches 80 and 81 which provide two test points, as will be discussed. As illustrated, each thermal sense element to be measured is connected to one of the FET switches. For instance, thermal sense element 12 of FIG. 1 has is +lead 20 connected to TS1(+), and its − lead 21 connected to TS1(−). When the enabling signal 1ENB is applied to the gate of FET 76, the FET is switched allowing current to flow through element 12. The resistor 85 and capacitor 86 act as an RC circuit. Thus, FET 76 must stay on long enough for the RC constant to be timed out, but must not stay on long enough for the current through the thermal sense element to be heated up, distorting the temperature measurement. For this reason, the duty cycle of the 1 ENB signal is 3%, as shown in FIG. 7. The other FET switches 77–79 are similarly connected to other thermal sense elements at TS2, TS3, and TS4, for this enabling circuit 50.

FET 80, when enabled by Test Point1 Enable (TB1ENB) signal, switches in resistors 90 and 91 whose resistance is at the lower value of that expected when a thermal sense element is at room temperature, and FET 81, when enabled by TB2ENB signal, switches in resistors 92 and 93, whose resistance is at the higher end of the expected value. Thus, each cycle of enabling signals will test the measurements being made by the analog measurement circuit 24, thereby testing the function of the circuit each cycle.

FIG. 7 is a timing diagram of the enabling signals for the enabling circuit 50 of FIG. 5. Each of the enabling signals 1ENB–4ENB and TP1ENB has a duty cycle of 3%, which the duty cycle of the TB2ENB signal is the remaining 85% of the cycle.

The calibration process will now be described. Calibration proceeds by determining R of at least one of the thermal sense elements. To accomplish this requires the coil to be at a known temperature and then measuring its resistance. With the system powered off, the cooling system is allowed to blow room temperature air across the chip. While this is in progress, the resistance of the coil is monitored while applying the reduced voltage as discussed. The coil is determined to be at room temperature when its resistance becomes stable i.e. stops changing. At this point the coil is at the same temperature (room temperature) as the air being moved across it. The power system now measures the room temperature at the air input to the cooling system used to cool the chip. The resultant is a known resistance at a known temperature i.e. we have R. The calibration data is stored for use in dynamic calculations of the chip temperature, as discussed. In the preferred embodiment, each thermal sense element is calibrated in a similar manner.

It will be understood that multiple enabling circuits 50 will be needed to measure all of the thermal sense elements shown on a board shown in FIG. 3.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method of measuring the temperature on an electronic chip comprising:

forming a plurality of thermally sensitive elements each having an initial resistance on the electronic chip;

successively in turn, placing a forced voltage in a cycle on each of said thermally sensitive elements at a known voltage and initial temperature;

in its successive turn, determining the initial resistance of each of the thermally sensitive elements at said known voltage and temperature;

in its successive turn, measuring the change of the resistance of each thermally sensitive element as the temperature of the electronic chip changes;

in its successive turn, comparing the change in the initial resistance of each thermally sensitive element from its initial resistance; and determining the temperature of the electronic chip from the initial resistances and change in resistances of said plurality of thermally sensitive elements during the operation of the electronic chip; wherein each thermally sensitive element is a spiral on metal on a metallization layer of the chip, said spiral of metal having a metal length of 20 mm and a width of 2.7 micrometers.

2. The method of claim 1 wherein each thermally sensitive element is formed of copper.

3. The method of claim 1 wherein the passing of electrical current step is performed while the electronic chip is turned off.

4. The method of the claim 3 wherein the known voltage for determining the initial resistance value of the thermally sensitive elements is about 0.3 volts.

5. The method of claim 1 wherein the determining of the change of resistance is performed by placing a second higher voltage on the thermally sensitive elements while the electronic chip is turned on.

6. The method of claim 5 wherein the second higher voltage is 0.75 volts.

7. The method of claim 1 wherein the forced voltage placed on each thermally sensitive element has a 3% duty cycle.

8. The method of claim 1 wherein the forced voltage is placed across test resistors during said cycle, one test resistor having a resistance near the low range of temperature and another test resistor having a resistance near the high range of temperature to thereby test the accuracy of the resistance values measured for the thermally sensitive elements.

9. An apparatus for measuring the temperature on an electronic chip comprising:
  a plurality of thermally sensitive elements each having an initial resistance on the electronic chip;
  a power supply successively in turn, placing in a cycle, a forced voltage on each of said thermally sensitive elements at a known voltage and initial temperature;
  a measuring circuit determining in its successive turn the initial resistance of one of the thermally sensitive elements at said known voltage and initial temperature;
  said measuring circuit measuring the change of the initial resistance of the thermally sensitive element during its successive turn as the temperature of the electronic chip changes;
  said measuring circuit comparing the change in the initial resistance of the thermally sensitive element from the initial resistance during the thermally sensitive element's successive turn; and
  said measuring circuit determining the temperature of the electronic chip from the initial resistances and change in resistances of the plurality of thermally sensitive elements during the operation of the electronic chip; wherein each thermally sensitive element is a spiral on metal on a metallization layer of the chip, said spiral of metal having a metal length of 20 mm and a width of 2.7 micrometers.

10. The apparatus of claim 9 wherein each thermally sensitive element is formed of copper.

11. The apparatus of claim 9 wherein the power supply passes electrical current through said thermally sensitive elements while the electronic chip is turned off.

12. The apparatus of claim 11 wherein the known voltage for determining the initial resistance value of the thermally sensitive elements is about 0.3 volts.

13. The apparatus of claim 9 wherein said measuring circuit determines the change of resistance as said power supply places a second higher voltage on the thermally sensitive elements while the electronic chip is turned on.

14. The apparatus of claim 13 wherein the second higher voltage is 0.75 volts.

15. The apparatus of claim 9 wherein the forced voltage placed on each thermally sensitive element has a 3% duty cycle.

16. The apparatus of claim 9 wherein said power supply comprises test resistors, and the forced voltage is placed across said test resistors during said cycle, one test resistor having a resistance near the low range of temperature and another test resistor having a resistance near the high range of temperature to thereby test the accuracy of the resistance values measured for the thermally sensitive elements.

* * * * *